US008891690B2

(12) United States Patent
Kim et al.

(10) Patent No.: US 8,891,690 B2
(45) Date of Patent: Nov. 18, 2014

(54) METHODS AND APPARATUSES FOR TRANSMITTING AND RECEIVING PREAMBLE FOR MULTIPLE CHANNEL ESTIMATION

(75) Inventors: Jee Hoon Kim, Daejeon-si (KR); Hyoung Kyu Song, Seongnam-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 60 days.

(21) Appl. No.: 13/539,091

(22) Filed: Jun. 29, 2012

(65) Prior Publication Data
US 2013/0266088 A1    Oct. 10, 2013

(30) Foreign Application Priority Data
Apr. 6, 2012    (KR) .................. 10-2012-0035789

(51) Int. Cl.
*H04L 27/06*    (2006.01)
(52) U.S. Cl.
USPC ........... 375/340; 370/335; 370/509; 375/267; 375/299
(58) Field of Classification Search
USPC .......... 370/203, 349, 474; 375/131, 133, 260, 375/267, 296, 299, 340
See application file for complete search history.

(56) References Cited

U.S. PATENT DOCUMENTS

| 7,567,533 | B2 * | 7/2009 | Lai .................. | 370/330 |
| 2002/0159412 | A1 * | 10/2002 | Odenwalder et al. ......... | 370/335 |
| 2005/0084030 | A1 * | 4/2005 | Zhou et al. .................... | 375/267 |
| 2006/0050799 | A1 | 3/2006 | Hou et al. | |
| 2012/0147997 | A1 * | 6/2012 | Nishikawa .................... | 375/340 |

FOREIGN PATENT DOCUMENTS

KR    10-0808145 B1    2/2008

OTHER PUBLICATIONS

Jee-Hoon Kim et al., "Preamble Design for Effective Multi-Channel Estimation in WiMedia UWB Systems", IEICE Trans. Commun., Jul. 2011, pp. 2145-2148, vol. E94-B No. 7, The Institute of Electronics, Information and Communication Engineers.

* cited by examiner

*Primary Examiner* — Leon-Viet Nguyen

(57) ABSTRACT

The present invention provides a method and apparatus for transmitting a preamble for multiple channel estimation. The method includes generating a channel estimation sequence, allocating the channel estimation sequence to some of a plurality of symbols in which a preamble is transmitted, and transmitting the preamble. The channel estimation sequence is generated by bisecting a sequence having a length N, generating a first sequence and a second sequence by adding a Zero-padded Suffix (ZS) having a zero value to a last part of each of the two bisected sequences, copying the first sequence and the second sequence at least once, and allocating the first sequences and the second sequences to some of the symbols.

6 Claims, 11 Drawing Sheets

METHODS AND APPARATUSES FOR TRANSMITTING AND RECEIVING PREAMBLE FOR MULTIPLE CHANNEL ESTIMATION

CROSS-REFERENCE TO RELATED APPLICATIONS

This application claims the benefit of priority Korean Patent Application No. 10-2012-0035789 filed on Apr. 6, 2012 which is incorporated by reference in their entirety herein.

BACKGROUND OF THE INVENTION

1. Field of the Invention

The present invention relates to wireless communication and, more particularly, to methods and apparatuses for transmitting and receiving a preamble for multiple channel estimation in an Ultra-WideBand (UWB) wireless communication system.

2. Related Art

The existing narrow band multiple access method has a limit in performing multimedia high-speed data wireless transmission. Accordingly, there is a lot of interest in UWB communication. UWB communication is technology for transmitting a very wide signal by using a short radio frequency pulse of a nanosecond or lower. A UWB communication system may be defined as a system having a frequency band whose center frequency is 20% or higher or whose bandwidth is 500 MHz or higher.

A preamble for channel estimation may be used in a UWB communication system. The preamble is a previously agreed signal which is added to the front part of a data section, and is used for power control of the signal, frequency offset correction, and time offset correction. The preamble may be transmitted in a plurality of symbol periods, for example, a plurality of Orthogonal Frequency Division Multiplexing (OFDM) symbols in the time domain. A channel estimation sequence is transmitted in some of the plurality of symbols.

A preamble, more particularly, a channel estimation sequence used in a UWB communication system requires a structure that may separate signals overlappingly received from the multiple antennas of a single relay terminal or from several relay terminals at the same time in order to enable the estimation of a UWB channel having a very large number of paths and improve reliability and the data rate. The simplest method of satisfying the requirement is to configure channel estimation sequences so that the sequences do not overlap in the time and frequency domains for each terminal. This method, however, is not preferred because the length of the channel estimation sequence is increased and frequency efficiency is deteriorated according to an increase in the number of relay terminals.

Meanwhile, a Space-Time Block Code (STBC) which may be used to estimate a channel in a multiple antenna system is basically designed such that codes transmitted for each antenna are orthogonal to each other in order to separate signals transmitted at the same time from the channel. Accordingly, a channel may be estimated without waste of frequency by using an STBC-based channel estimation sequence even in a cooperative communication environment including a plurality of relay terminals. This common channel estimation sequence, however, is problematic in that channel estimation performance is deteriorated because interference is generated between symbols if the number of multiple paths is many as in a UWB channel.

Accordingly, there is a need for a method and apparatus for transmitting a preamble including a channel estimation sequence, which are capable of improving the channel estimation ability of a system that performs transmission while performing frequency hopping, such as a UWB system, in an environment in which one relay terminal using multiple antennas or a plurality of relay terminal relays a signal through cooperation.

SUMMARY OF THE INVENTION

An object of the present invention is to provide a method and apparatus for transmitting a preamble, which enable multiple channel estimation in a UWB wireless communication system.

In an aspect, there is provided a method of transmitting a preamble for multiple channel estimation. The method includes generating a channel estimation sequence; allocating the channel estimation sequence to some of a plurality of symbols in which the preamble is transmitted; and transmitting the preamble, wherein the channel estimation sequence is generated by bisecting a sequence having a length N, generating a first sequence and a second sequence by adding a Zero-padded Suffix (ZS) having a zero value to the last part of each of the two bisected sequences, copying the first sequence and the second sequence at least once, and allocating the first sequences and the second sequences to some of the symbols.

The some symbols may be 6 Orthogonal Frequency Division Multiplexing (OFDM) symbols, and the length N may be 256.

When the some symbols include 6 symbols and the 6 symbols are sequentially a symbol 1, a symbol 2, a symbol 3, a symbol 4, a symbol 5, and a symbol 6, the first sequence may be allocated to the symbols 1, 3, and 5 and the second sequence may be allocated to the symbols 2, 4, and 6. When a first frequency band, a second frequency band, and a third frequency band sequentially from a lower frequency band exist, the symbols 1 and 4 may be transmitted in the first frequency band, the symbols 2 and 5 may be transmitted in the second frequency band, and the symbols 3 and 6 may be transmitted in the third frequency band.

When the some symbols include 6 symbols and the 6 symbols are sequentially a symbol 1, a symbol 2, a symbol 3, a symbol 4, a symbol 5, and a symbol 6, the first sequence may be allocated to the symbols 1, 3, and 5 and the second sequence may be allocated to the symbols 2, 4, and 6. When a first frequency band, a second frequency band, and a third frequency band sequentially from a lower frequency band exist, the symbols 1 and 4 may be transmitted in the first frequency band, the symbols 3 and 6 may be transmitted in the second frequency band, and the symbols 2 and 5 may be transmitted in the third frequency band.

When the some symbols include 6 symbols and the 6 symbols are sequentially a symbol 1, a symbol 2, a symbol 3, a symbol 4, a symbol 5, and a symbol 6, the first sequence may be allocated to the symbols 1, 3, and 5 and the second sequence may be allocated to the symbols 2, 4, and 6. When a first frequency band, a second frequency band, and a third frequency band sequentially from a lower frequency band exist, the symbols 1 and 2 may be transmitted in the first frequency band, the symbols 3 and 4 may be transmitted in the second frequency band, and the symbols 5 and 6 may be transmitted in the third frequency band.

When the some symbols include 6 symbols and the 6 symbols are sequentially a symbol 1, a symbol 2, a symbol 3, a symbol 4, a symbol 5, and a symbol 6, the first sequence may be allocated to the symbols 1, 3, and 5 and the second sequence may be allocated to the symbols 2, 4, and 6. When a first frequency band, a second frequency band, and a third frequency band sequentially from a lower frequency band exist, the symbols 1 and 2 may be transmitted in the first frequency band, the symbols 3 and 4 may be transmitted in the third frequency band, and the symbols 5 and 6 may be transmitted in the second frequency band.

When the some symbols include 6 symbols and the 6 symbols are sequentially a symbol 1, a symbol 2, a symbol 3, a symbol 4, a symbol 5, and a symbol 6, the first sequence may be allocated to the symbols 1 and 4, the second sequence may be allocated to the symbols 2 and 5, and a zero value is inserted into the symbols 3 and 6. When a first frequency band, a second frequency band, and a third frequency band sequentially from a lower frequency band exist, all the symbols 1 to 6 may be transmitted in any one of the first frequency band to the third frequency band.

When the some symbols include 6 symbols and the 6 symbols are sequentially a symbol 1, a symbol 2, a symbol 3, a symbol 4, a symbol 5, and a symbol 6, the first sequence may be allocated to the symbols 1, 2, 5, and 6 and the second sequence may be allocated to the symbols 3 and 4. When a first frequency band, a second frequency band, and a third frequency band sequentially from a lower frequency band exist, the symbols 1, 3, and 5 may be transmitted in the first frequency band and the symbols 2, 4, and 6 may be transmitted in the second frequency band.

When the some symbols include 6 symbols and the 6 symbols are sequentially a symbol 1, a symbol 2, a symbol 3, a symbol 4, a symbol 5, and a symbol 6, the first sequence may be allocated to the symbols 1, 2, 5, and 6 and the second sequence may be allocated to the symbols 3 and 4. When a first frequency band, a second frequency band, and a third frequency band sequentially from a lower frequency band exist, the symbols 1, 3, and 5 may be transmitted in the first frequency band and the symbols 2, 4, and 6 may be transmitted in the third frequency band.

When the some symbols include 6 symbols and the 6 symbols are sequentially a symbol 1, a symbol 2, a symbol 3, a symbol 4, a symbol 5, and a symbol 6, the first sequence may be allocated to the symbols 1, 2, 5, and 6 and the second sequence may be allocated to the symbols 3 and 4. When a first frequency band, a second frequency band, and a third frequency band sequentially from a lower frequency band exist, the symbols 1, 3, and 5 may be transmitted in the second frequency band and the symbols 2, 4, and 6 may be transmitted in the third frequency band.

The channel estimation sequence may be a Constant Amplitude and Zero Auto-Correlation (CAZAC) sequence.

In another aspect, there is provided a method of receiving a preamble for multiple channel estimation. The method includes receiving a channel estimation sequence in some of a plurality of symbols in which the preamble is transmitted and restoring the channel estimation sequence, wherein the channel estimation sequence is generated by bisecting a sequence having a length N, generating a first sequence and a second sequence by adding a Zero-padded Suffix (ZS) having a zero value to the last part of each of the two bisected sequences, copying the first sequence and the second sequence at least once, and allocating the first sequences and the second sequences to some of the symbols, and restoring the channel estimation sequence includes generating the channel estimation sequence by combining the first sequence and the second sequence.

The ZS included in the first sequence may be added to the front part of the second sequence, and the ZS included in the second sequence may be added to the front part of the first sequence.

In yet another aspect, there is provided an apparatus for transmitting a preamble for multiple channel estimation. The apparatus includes a Radio Frequency (RF) unit configured to transmit a radio signal and a processor coupled to the RF unit, wherein the processor generates a channel estimation sequence, allocate the channel estimation sequence to some of a plurality of symbols in which the preamble is transmitted, and transmit the preamble through the RF unit, and the channel estimation sequence is generated by bisecting a sequence having a length N, generating a first sequence and a second sequence by adding a Zero-padded Suffix (ZS) having a zero value to the last part of each of the two bisected sequences, copying the first sequence and the second sequence at least once, and allocating the first sequences and the second sequences to some of the symbols.

The some symbols may be 6 Orthogonal Frequency Division Multiplexing (OFDM) symbols, and the length N may be 256.

The channel estimation sequence may be a Constant Amplitude and Zero Auto-Correlation (CAZAC) sequence.

In yet another aspect, there is provided an apparatus for receiving a preamble for multiple channel estimation. The apparatus includes a Radio Frequency (RF) unit configured to receive a radio signal and a processor coupled to the RF unit, wherein the processor receives a channel estimation sequence in some of a plurality of symbols in which the preamble is transmitted and restores the channel estimation sequence, the channel estimation sequence is generated by bisecting a sequence having a length N, generating a first sequence and a second sequence by adding a Zero-padded Suffix (ZS) having a zero value to the last part of each of the two bisected sequences, copying the first sequence and the second sequence at least once, and allocating the first sequences and the second sequences to some of the symbols, and the processor restores the channel estimation sequence by combining the first sequence and the second sequence.

The channel estimation sequence may be restored to the sequence having the length N by adding the ZS included in the first sequence to the front part of the second sequence, adding the ZS included in the second sequence to the front part of the first sequence, and then combining the first and second sequences.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DESCRIPTION OF EXEMPLARY EMBODIMENTS

An Ultra Wide Band (UWB) wireless communication system is a wireless communication system which supports wireless connection at a high speed using 3.1 GHz to 10.6 GHz. In a UWB wireless communication system, when a transmission terminal sends a signal, a target terminal receives the signal. Here, the signal transmitted by the transmission terminal may be transmitted to the target terminal via a plurality of relay terminals. In this case, the target terminal needs to estimate channels by separating signals from the plurality of relay terminals from the channels.

The preamble may be transmitted through a plurality of symbols, for example, 30 or 18 Orthogonal Frequency Division Multiplexing (OFDM) symbols. Some, for example, the last 6 OFDM symbols of the OFDM symbols forming the preamble may be used to estimate the channel. That is, a sequence having orthogonality may be transmitted in some OFDM symbols forming a preamble. A target terminal may perform channel estimation by using the sequence. In this sense, the sequence is referred to as a channel estimation sequence. The Fast Fourier Transform (FFT) size of each OFDM symbol including a channel estimation sequence may be 128, and the guard interval size of a Zero-padded Suffix (ZS) method may be 32.

A method in which a target terminal estimates channels by separating signals from a plurality of relay terminals from the channels by using a Constant Amplitude and Zero Auto-Correlation (CAZAC) sequence as a channel estimation sequence is described below.

First, a Zadoff-Chu sequence, such as that shown in Equation 1 below, may be used as the CAZAC sequence.

$$C_n = \exp j \frac{\eta \pi n^2}{N}, \quad [\text{Equation 1}]$$
$$n = 0, 1, \ldots, N-1$$

In Equation 1, N indicates the length of a sequence, and η is an integer having a coprime relation with N.

Figure 1:
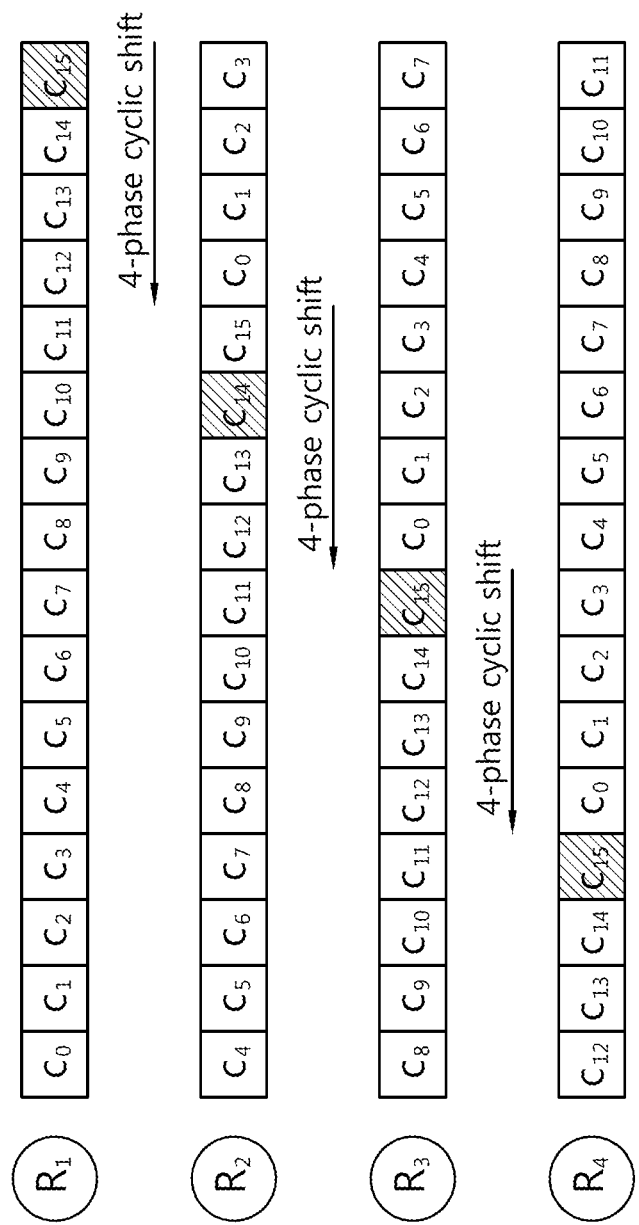
FIG. 1 show an example of a CAZAC sequence structure which may be used in each relay terminal when the number of relay terminals is 4.

FIG. 1 show an example of a CAZAC sequence structure which may be used in each relay terminal when the number of relay terminals is 4.

Referring to FIG. 1, a relay terminal #m uses a CAZAC sequence #m (indicated by $R_m$, wherein m is any one of 1, 2, 3, and 4). In case of CAZAC sequences used in four relay terminals, it can be seen that the CAZAC sequences have been cyclically shifted by the number obtained by dividing all the sequences by the number of terminals. That is, $R_2$ has been subjected to 4-phase cyclic shift from $R_1$, $R_3$ has been subjected to 4-phase cyclic shift from $R_2$, and $R_4$ has been subjected to 4-phase cyclic shift from $R_3$.

In other words, a channel estimation sequence used in each relay terminal may be generated by cyclically shifting a specific CAZAC sequence by the number obtained by diving the length of a sequence (=16), used for channel estimation, by the number of relay terminals (=4). It has been known that this method maximizes the number of paths that may be estimated.

If this method is ordinarily extended, after generating a CAZAC sequence corresponding to the length N of a channel estimation sequence, the generated CAZAC sequence may be allocated when cooperative communication is started so that an $m^{th}$ relay terminal uses a CAZAC sequence-based channel estimation sequence cyclically shift by (m−1)*L with consideration taken of a maximum multiple path L in a channel environment used in a system. In accordance with this method, optimum channel estimation performance may be obtained while using a preamble always having the same structure, irrespective of a change in the number of relay terminals participating in cooperation.

If the number of relay terminals is M, however, the following limits are set in order to guarantee orthogonality between preambles used in the relay terminals.

$$M \leq \frac{N}{L} \quad [\text{Equation 2}]$$

In Equation 2, N indicates the length of a sequence, and L indicates a maximum multiple path. For example, of the length N of a sequence is 128 and the number of maximum multiple paths are 120, M is 1.

If a sequence is not sufficient long, the number of multiple paths is many, and thus the condition of Equation 2 is not guaranteed, orthogonality is not guaranteed because preambles transmitted by a plurality of relay terminals overlap with one another owing to the multiple paths. Accordingly, channel estimation performance is deteriorated or, in a worse case, channel estimation itself is impossible.

Figure 2:
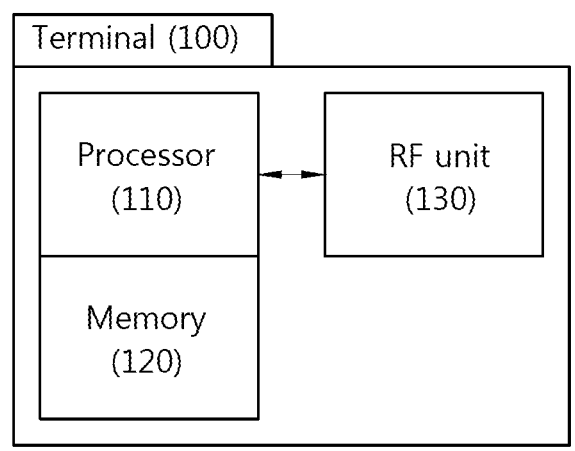
FIG. 2 shows the structure of a terminal according to an embodiment of the present invention.

FIG. 2 shows the structure of a terminal according to an embodiment of the present invention.

Referring to FIG. 2, the terminal 100 includes a processor 110, memory 120, and a Radio Frequency (RF) unit 130.

The processor 110 generates and sends a channel estimation sequence to be described later when the terminal 100 is operated as a relay terminal. Furthermore, when the terminal 100 is operated as a target terminal, the processor 110 performs channel estimation by receiving and restoring a channel estimation sequence.

The memory 120 is coupled to the processor 110 and is configured to store various pieces of information for driving the processor 110. The RF unit 130 is coupled to the processor 110 and is configured to send and/or receive radio signals.

Methods of generating channel estimation sequences according to the present invention are described below.

First, in a UWB wireless communication system, 6 OFDM symbols used in channel estimation may be transmitted with a hopping pattern according to a Time-Frequency Code (TFC) as in the following table.

TABLE 1

| HOPPING PATTERN | TIME FREQUENCY CODE | | | | | |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |
| 8 | 1 | 2 | 1 | 2 | 1 | 2 |
| 9 | 1 | 3 | 1 | 3 | 1 | 3 |
| 10 | 2 | 3 | 2 | 3 | 2 | 3 |

In Table 1, when the hopping pattern is 5, all the 6 OFDM symbols are transmitted in the same frequency band (e.g., the frequency band #1). This is true of when the hopping patterns are 6 and 7 (i.e., transmitted through the frequency bands #2 and #3). That is, all the 6 OFDM symbols are used for the channel estimation of one frequency band by taking interference between the OFDM symbols into consideration owing to the influence of multiple paths.

In the remaining hopping patterns, 3 or 2 OFDM symbols are transmitted through each of 2 or 3 different frequency bands. Since OFDM symbols are transmitted through different frequency bands, only the 3 or 2 OFDM symbols per frequency band are allocated for channel estimation with consideration taken of relatively small interference between the OFDM symbols. Even in this case, an error in the channel estimation is within an acceptable range determined in a system.

In order to maximize channel estimation performance while utilizing a hopping pattern structure to a maximum extent, the following channel estimation sequences may be generated. In the following method, it is assumed that a target terminal receives a signal through two relay terminals and a maximum multiple path is 120. A first channel estimation sequence may use a first relay terminal, and a second channel estimation sequence may use a second relay terminal.

Figure 3:
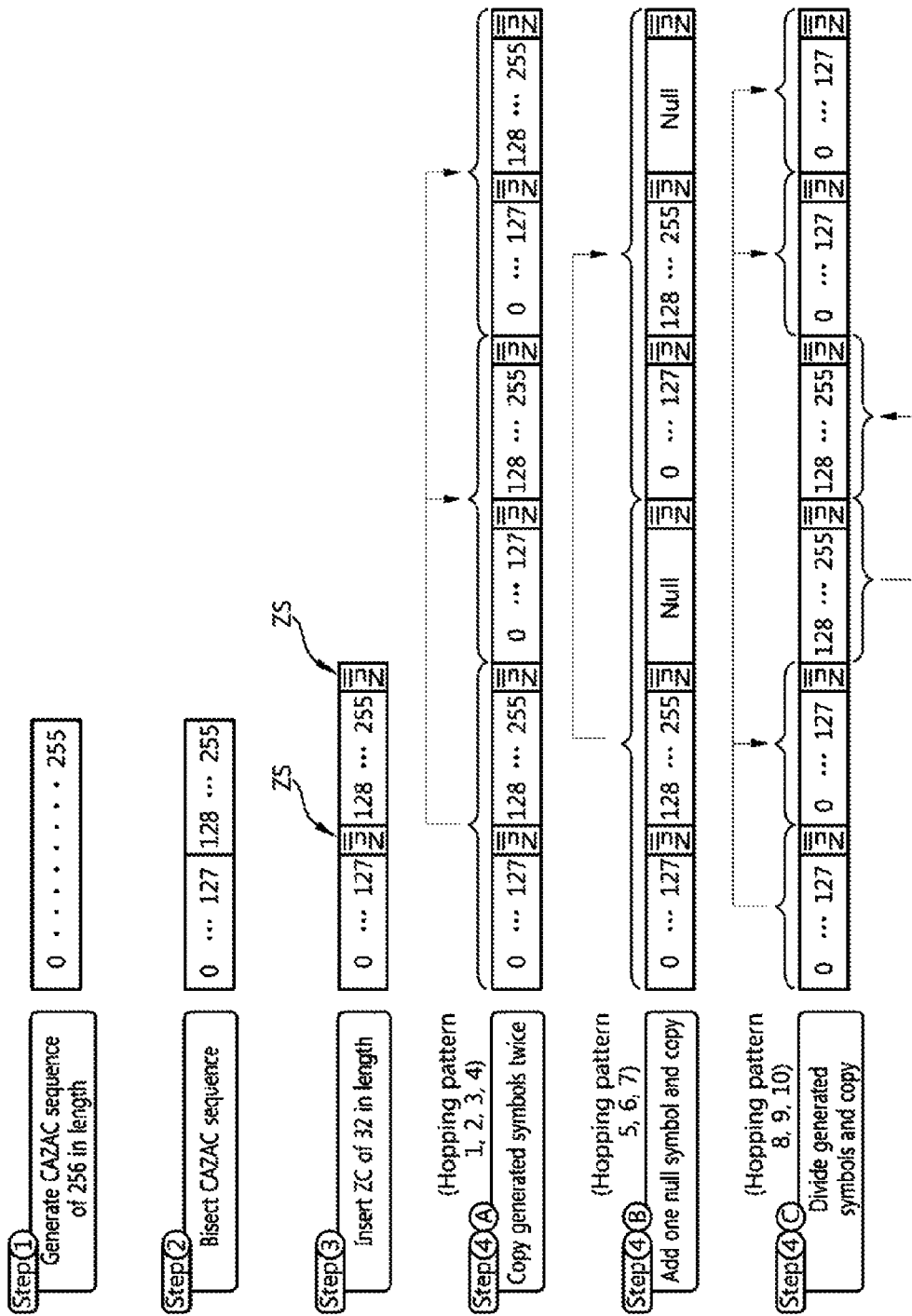
FIG. 3 shows a method of generating a channel estimation sequence according to an embodiment of the present invention.

FIG. 3 shows a method of generating a channel estimation sequence according to an embodiment of the present invention.

Referring to FIG. 3, a CAZAC sequence having a length of N, for example, N=256 is generated (Step 1). The CAZAC sequence may be generated using Equation 1. N means the length of the sequence and may refer to the number of samples when FFT is performed.

The generated CAZAC sequence is bisected (Step 2), and two sequences are generated by inserting a Zero-padded Suffix (ZS) having a length of 32 into the end of each of the bisected sequences (Step 3). The ZS is also called 'null'. The two sequences are called a first sequence and a second sequence. Each of the first sequence and the second sequence become a unit allocated to each symbol. Accordingly, this process may be considered as generating two symbols.

Next, three types of generating methods are possible according to a hopping pattern. First, when the hopping pattern of Table 1 is 1, 2, 3, or 4, 6 symbols are generated by twice copying the two symbols generated at step 3 as in step 4A of FIG. 3 (Step 4A).

When the hopping pattern is 5, 6, or 7, three symbols are generated by adding one null symbol behind the two symbols generated at step 3, and 6 symbols are generated by copying all the three symbols (Step 4B).

When the hopping pattern is 8, 9, or 10, 6 symbols are generated by individually copying the two symbols generated at step 3 (Step 4C). A difference between step 4C and step 4A is that the same symbol is continuously generated twice.

The first channel estimation sequence is generated in accordance this method. That is, in order to generate the first channel estimation sequence, the first sequence and the second sequence are copied at least once and are allocated to symbols on which the channel estimation sequence is transmitted. Furthermore, the second channel estimation sequence is generated by cyclically shifting the CAZAC sequence having a length of 256, generated at step 1, by 128 and then performing the same process as a process of generating the first channel estimation sequence.

The channel estimation sequence according to the present invention is different from a conventional method in the UWB wireless communication system. That is, a sequence for the channel estimation is a CAZAC sequence which observes the conventional hopping pattern. According to the present invention, multiple channel estimation is possible and the performance for single channel estimation can be improved.

Methods of sending the generated channel estimation sequence are described below.

FIGS. 4 to 7 illustrate the methods of transmitting a channel estimation sequence according to a hopping pattern.

Figure 4:
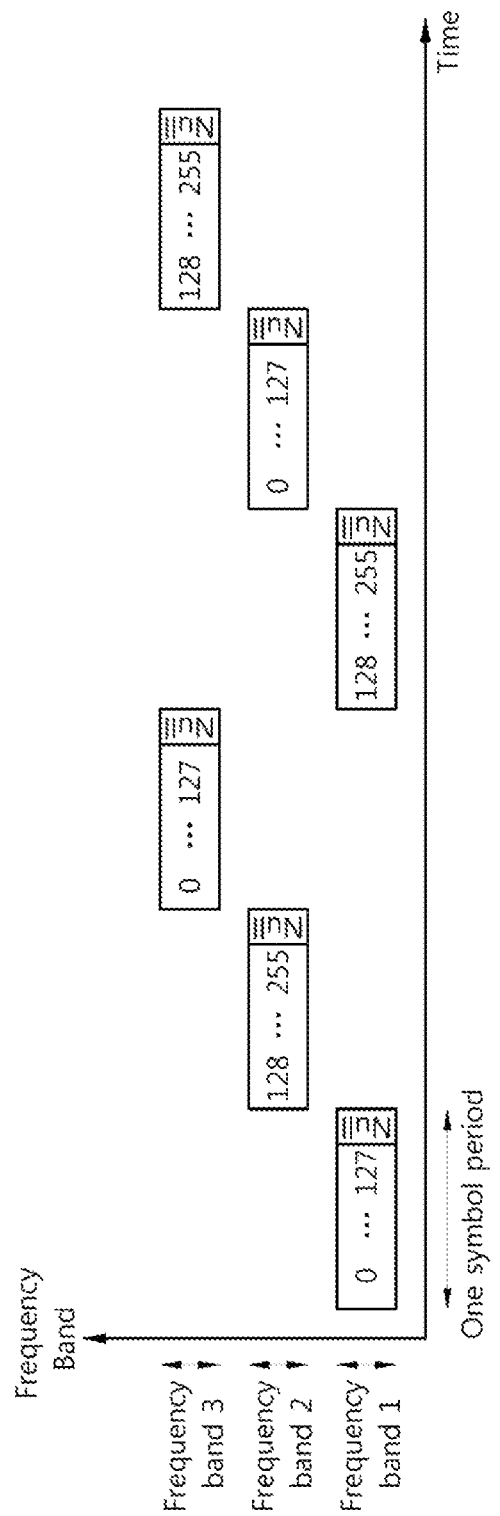
FIGS. 4 to 7 illustrate methods of transmitting a channel estimation sequence according to a hopping pattern.

FIG. 4 shows a method of transmitting each channel estimation sequence when a hopping pattern is 1. Referring to FIG. 4, two CAZAC sequences each having a length 256 are transmitted in each frequency band.

Figure 5:
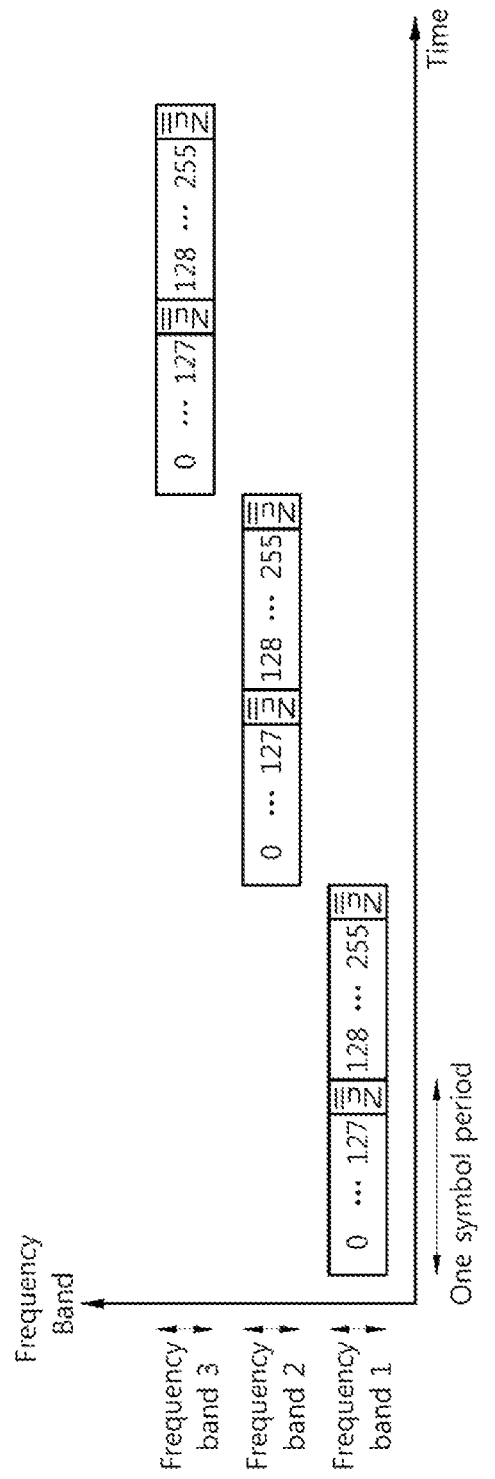

FIG. 5 shows the structure of each channel estimation sequence when a hopping pattern is 3. Referring to FIG. 5, one CAZAC sequence of 256 in length is transmitted in each frequency band.

Figure 6:
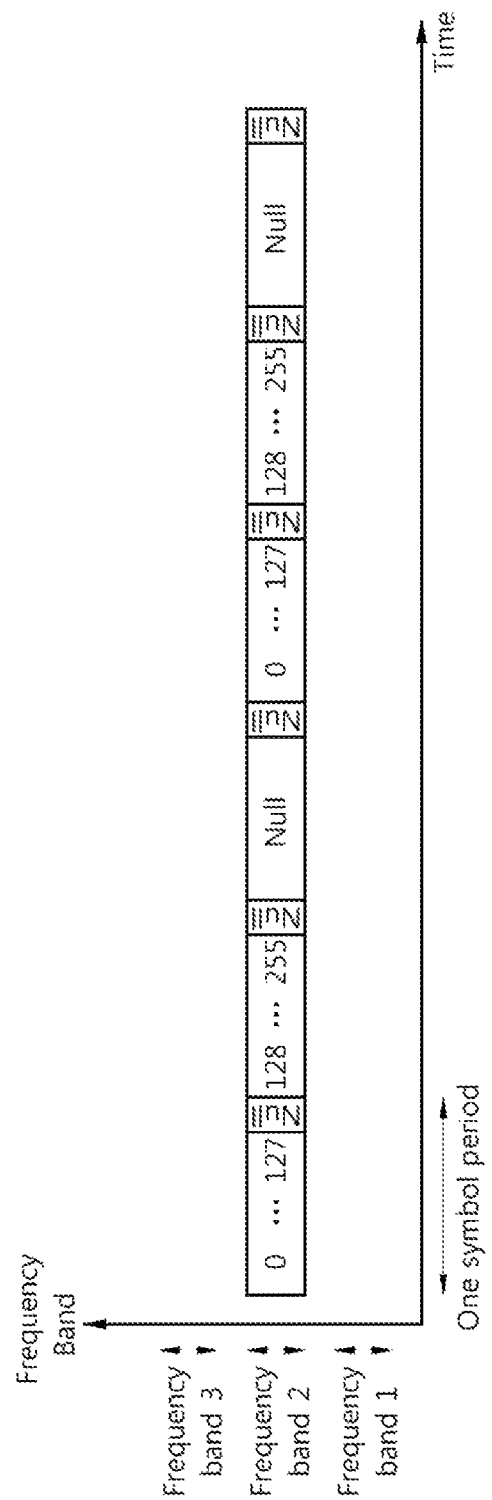

FIG. 6 shows the structure of each channel estimation sequence when a hopping pattern is 6. Referring to FIG. 6, 2 CAZAC sequences of 256 in length are transmitted in the frequency band 2.

Figure 7:
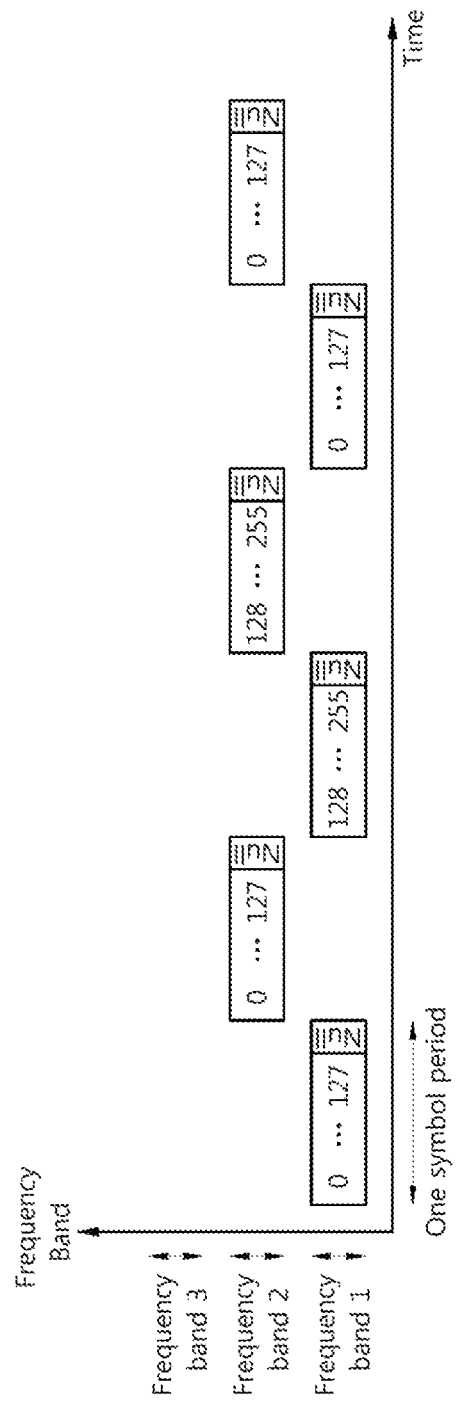

FIG. 7 shows the structure of each channel estimation sequence when a hopping pattern is 8. Referring to FIG. 7, one and half CAZAC sequence of 256 in length is transmitted in each of the frequency bands 1 and 2.

As shown in FIGS. 4 to 7, one or more CAZAC sequences are transmitted through at least one frequency band in any hopping pattern. If the entire sequence of 256 in length is not consecutively transmitted, but a ZS is added to each symbol and the symbols are distributed and transmitted in the time or frequency domain, a problem may arise because orthogonality is guaranteed. This orthogonality problem may be solved by performing the following processing process in a target terminal.

Figure 8:
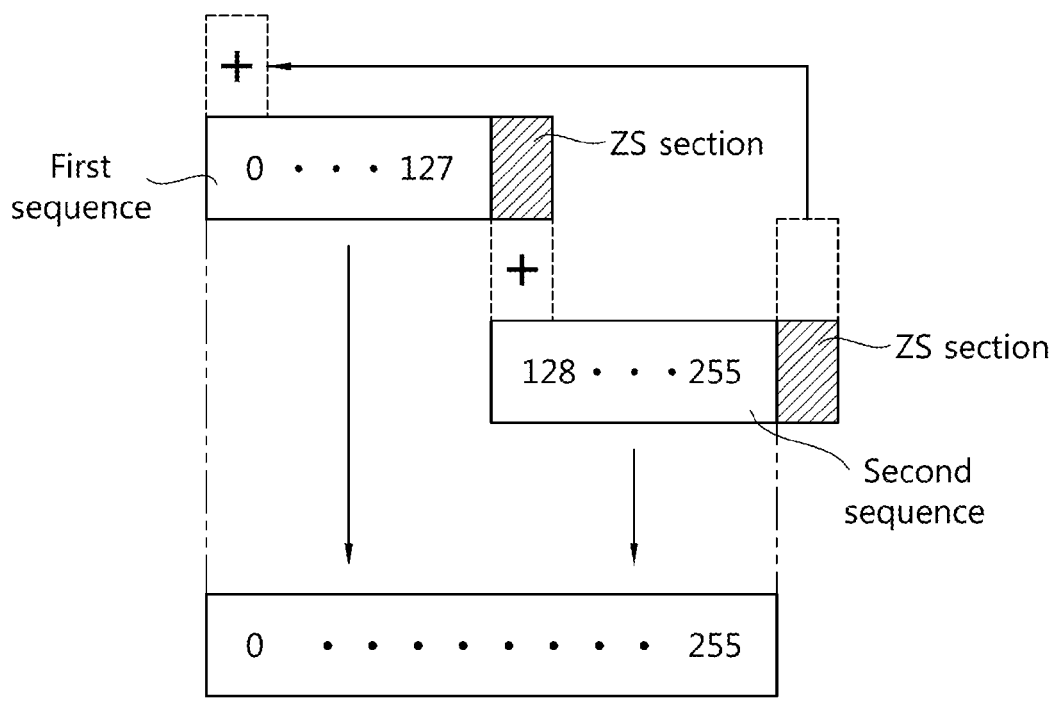
FIG. 8 shows a process of processing a channel estimation sequence in a reception terminal.

FIG. 8 shows a process of processing a channel estimation sequence in a reception terminal.

Referring to FIG. 8, the reception terminal may receive a first sequence and a second sequence, each including information about half of a CAZAC sequence of 256 in length and a ZS, in different frequency bands and time. The first sequence and the second sequence are composed in the reception terminal. Here, a component of multiple paths generated in the ZS section of the first sequence is added to the start part of the second sequence, and a component of multiple paths generated in the ZS section of the second sequence is added to the start part of the first sequence.

The first sequence and the second sequence are restored to the entire CAZAC sequence of 256 in length through the composition process. In other words, the transmitter distributes and transmits CAZAC sequence of 2 OFDM symbols in time domain and the receiver restores the CAZAC sequence. Through this process, the deterioration by the severe multipath fading can be compensated effectively. In the prior art, since a channel estimation sequence of 128 in length is transmitted for each OFDM symbol, channel estimation is possible by using only one OFDM symbol according to circumstances. In contrast, in the present invention, a section operation is essential because a channel estimation sequence of 256 in length is distributed and transmitted through at least two OFDM symbols. This means that twice memory is required as compared with the prior, but a load of additional memory for cooperation transmission is indispensable.

If, as described above, the channel estimation sequence according to the embodiment of the present invention is transmitted, channel estimation can be efficiently performed even in a CM3 environment in which two relay terminals are accommodated at the same time and a maximum of 120 multiple paths exist. Here, CM3 is one of UWB channel models. CM1 is a Line Of Sight (LOS) environment and a channel model within a distance of 0 to 4 meters. CM2 is a Non-LOS (NLOS) environment and a channel model within a distance of 0 to 4 meters. CM3 is an NLOS environment and a channel model within a distance of 4 to 10 meters.

A conventional channel estimation sequence is deteriorated when channel estimation is performed because a maximum number of multiple paths are greater than the size of a guard interval even when only one terminal is used in the CM1 environment having the best channel environment, other than the hopping patterns 1 and 2.

Performance when the channel estimation sequence according to the present invention is demonstrated through a Mean Square Error (MSE).

Figure 9:
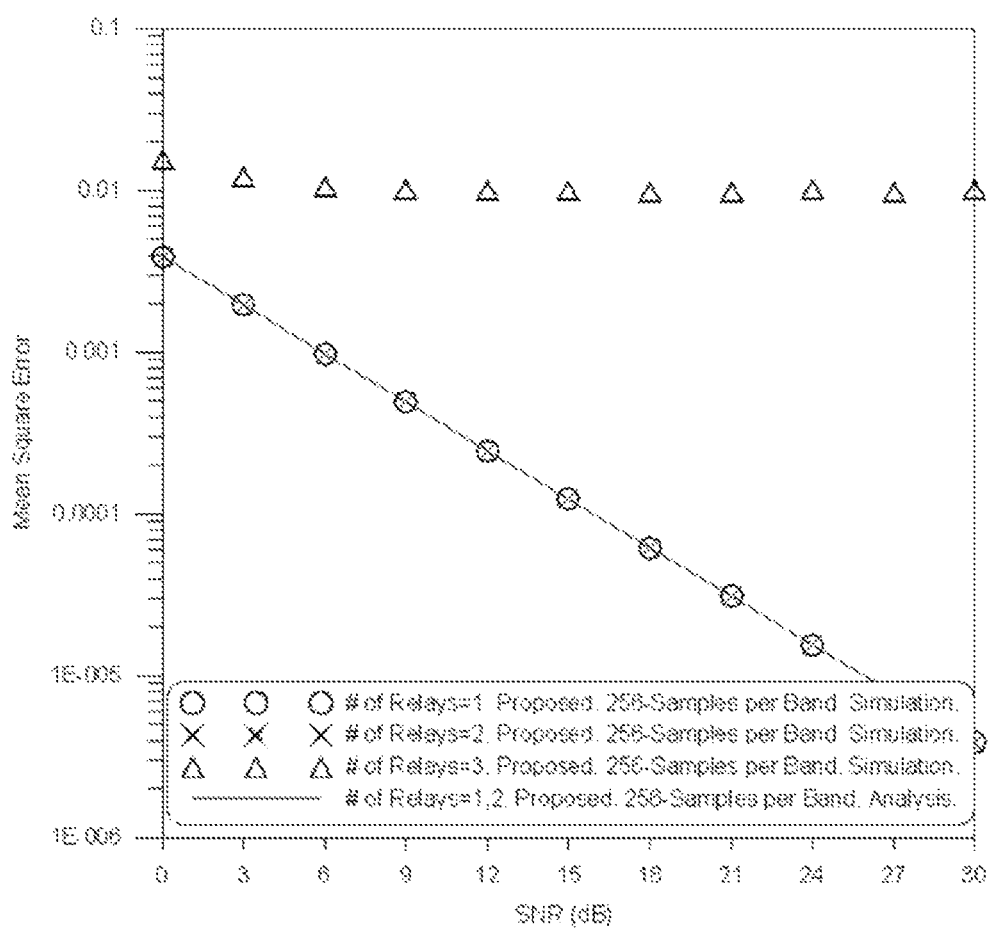
FIGS. 9 to 11 show channel estimation performances when a CAZAC sequence-based preamble according to the present invention is used in UWB CM3 in which a maximum number of multiple paths are 120.
Figure 10:
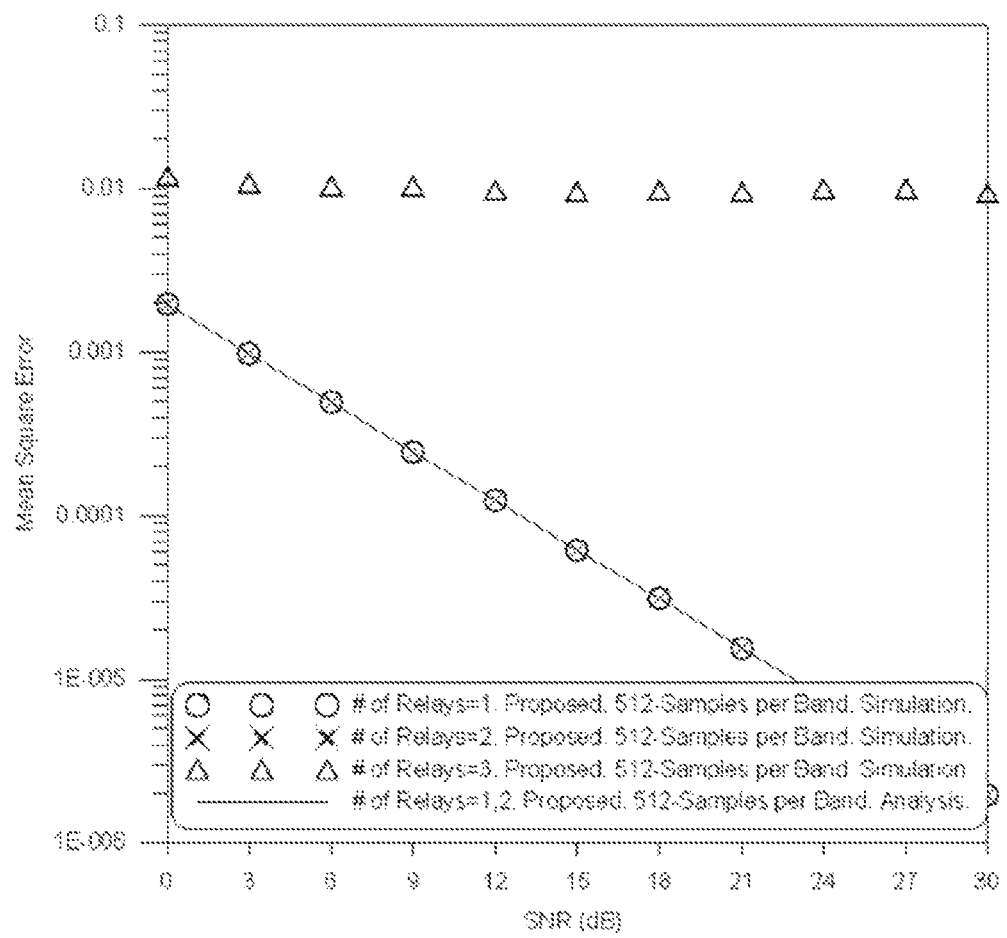
Figure 11:
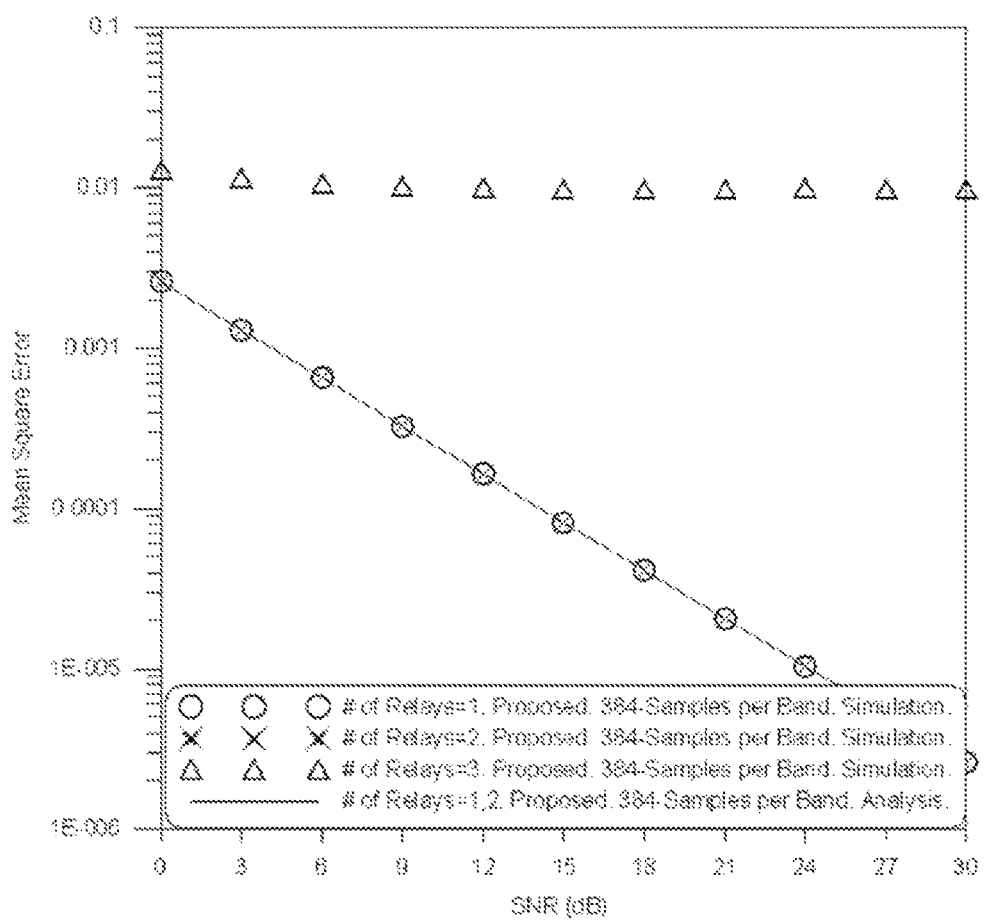

FIGS. 9 to 11 show channel estimation performances when the CAZAC sequence-based preamble according to the present invention is used in UWB CM3 in which a maximum number of multiple paths are 120. A channel model used in simulations was modeled in the Institute of Electrical and Electronics Engineers (IEEE), and a different number of multiple paths were generated every time. A Least Square (LS) method was used in channel estimation, one antenna was mounted on each target terminal, and it was assumed that each relay terminal was subject to the same channel Signal to Noise Ratio (SNR) and time and frequency synchronization was perfect in the target terminal. It was also assumed that a plurality of relay terminals other than a transmission terminal sent signals to the target terminal at the same time.

When the length of a channel estimation sequence was longer than a channel response length, the following equation was satisfied.

$$MSE = E\left[(h(i) - \hat{h}(i))^2\right] \quad \text{[Equation 3]}$$
$$= E[(h(i) - h(i) - \overline{w}(i))^2]$$
$$= \frac{1}{N} E[(w(i))^2]$$
$$= \frac{\sigma_w^2}{N}$$

In Equation 3, h(i) indicates an impulse response of an $i^{th}$ channel, and $\hat{h}(i)$ indicates an estimated impulse response of the $i^{th}$ channel. w(i) indicates added white Gaussian noise, N indicates the length of the channel estimation sequence, and $\sigma_w^2$ indicates a variance of the white Gaussian noise.

FIG. 9 is a graph showing an MSE when the hopping patterns are 1 to 4. When the hopping patterns are 1 to 4, one CAZAC sequence of 256 in length is used in each frequency band. In accordance with Equation 2, the channel estimation sequence of 256 in length may accommodate a maximum of two relay terminals, and a result of MSE simulations is identical with Equation 3. FIG. 10 shows that two CAZAC sequences each having a length of 256 are used when the hopping patterns are 5 to 7 and have an additional gain of about 3 dB as compared with the hopping patterns 1 to 4. It can be also seen that FIG. 10 has the same value as a value analyzed using Equation 3. FIG. 11 shows that one and half CAZAC sequence of 256 in length is used per frequency band when the hopping patterns are 8 to 10 and has MSE performance corresponding to the middle of the simulations result of FIGS. 9 and 10. If two symbols in the rear are not used for channel estimation by using a partial correlation when the hopping patterns are 8 to 10, the same result as the simulation result of FIG. 8 may be obtained.

In accordance with the present invention, channel estimation can be efficiently performed although signals are received through a large number of antennas or relay terminals even in an environment in which a plurality of multiple paths exists in a UWB wireless communication system.

While the invention has been shown and described with respect to the preferred embodiments, it will be understood by those skilled in the art that various changes and modifications may be made without departing from the spirit and scope of the invention as defined in the following claims.

What is claimed is:

1. A method of transmitting a preamble for multiple channel estimation the method comprising:
    bisecting a channel estimation sequence having a length N to generate a first bisected sequence and a second bisected sequence;
    generating a first sequence by appending a Zero-padded Suffix (ZS) having a zero value to an end of the first bisected sequence;
    generating a second sequence by appending the ZS to an end of the second bisected sequence;
    allocating all of the first sequence to each of at least two symbols of a plurality of symbols in which the preamble is transmitted;
    allocating all of the second sequence to each of at least two symbols of the plurality of symbols; and
    transmitting the preamble, wherein:
    a transmitter is used to perform the method, and
    when the plurality of symbols include 6 symbols and the 6 symbols are sequentially a symbol 1, a symbol 2, a symbol 3, a symbol 4, a symbol 5, and a symbol 6,
    the first sequence is allocated to the symbols 1, 3, and 5 and the second sequence is allocated to the symbols 2, 4, and 6, and
    the symbols 1 and 4 are transmitted in a first frequency band, the symbols 2 and 5 are transmitted in a second frequency band, and the symbols 3 and 6 are transmitted in a third frequency band.

2. The method as claimed in claim 1, wherein the plurality of symbols are 6 Orthogonal Frequency Division Multiplexing (OFDM) symbols.

3. The method as claimed in claim 1, wherein the length N is 256.

4. The method as claimed in claim 1, wherein
    the channel estimation sequence is a Constant Amplitude and Zero Auto-Correlation (CAZAC) sequence, and
    wherein the CAZAC sequence is generated using an equation below $$C_n = \exp j \frac{\eta \pi n^2}{N}, \quad \text{[Equation]}$$
$$n = 0, 1, \ldots, N-1$$

wherein N is the length of the CAZAC sequence and Ti is an integer having a coprime relation with the length N.

5. A method of transmitting a preamble for multiple channel estimation the method comprising:
    bisecting a channel estimation sequence having a length N to generate a first bisected sequence and a second bisected sequence;
    generating a first sequence by appending a Zero-padded Suffix (ZS) having a zero value to an end of the first bisected sequence;
    generating a second sequence by appending the ZS to an end of the second bisected sequence;

allocating all of the first sequence to each of at least two symbols of a plurality of symbols in which the preamble is transmitted;

allocating all of the second sequence to each of at least two symbols of the plurality of symbols; and transmitting the preamble, wherein:

a transmitter is used to perform the method, and when the plurality of symbols include 6 symbols and the 6 symbols are sequentially a symbol 1, a symbol 2, a symbol 3, a symbol 4, a symbol 5, and a symbol 6, the first sequence is allocated to the symbols 1 and 4, the second sequence is allocated to the symbols 2 and 5, and a zero value is inserted into the symbols 3 and 6, and all the symbols 1 to 6 are transmitted in a same frequency band.

6. A method of transmitting a preamble for multiple channel estimation the method comprising:

bisecting a channel estimation sequence having a length N to generate a first bisected sequence and a second bisected sequence;

generating a first sequence by appending a Zero-padded Suffix (ZS) having a zero value to an end of the first bisected sequence;

generating a second sequence by appending the ZS to an end of the second bisected sequence;

allocating all of the first sequence to each of at least two symbols of a plurality of symbols in which the preamble is transmitted;

allocating all of the second sequence to each of at least two symbols of the plurality of symbols; and transmitting the preamble, wherein:

a transmitter is used to perform the method, and when the plurality of symbols include 6 symbols and the 6 symbols are sequentially a symbol 1, a symbol 2, a symbol 3, a symbol 4, a symbol 5, and a symbol 6, the first sequence is allocated to the symbols 1, 2, 5, and 6 and the second sequence is allocated to the symbols 3 and 4, and the symbols 1, 3, and 5 are transmitted in a first frequency band and the symbols 2, 4, and 6 are transmitted in a second frequency band.

* * * * *